United States Patent
Buannic et al.

(10) Patent No.: US 9,698,417 B2
(45) Date of Patent: Jul. 4, 2017

(54) MIXED OXIDE OF TITANIUM AND NIOBIUM COMPRISING A TRIVALENT METAL

(71) Applicant: COMMISSARIAT A L'ENERGIE ATOMIQUE ET AUX ENERGIES ALTERNATIVES, Paris (FR)

(72) Inventors: Lucienne Buannic, Suresnes (FR); Jean-François Colin, Meylan (FR); Marlène Rey, Veurey Voroize (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 134 days.

(21) Appl. No.: 14/762,824

(22) PCT Filed: Jan. 16, 2014

(86) PCT No.: PCT/FR2014/050080
§ 371 (c)(1),
(2) Date: Jul. 23, 2015

(87) PCT Pub. No.: WO2014/122376
PCT Pub. Date: Aug. 14, 2014

(65) Prior Publication Data
US 2015/0364757 A1 Dec. 17, 2015

(30) Foreign Application Priority Data

Feb. 6, 2013 (FR) ..................... 13 51023

(51) Int. Cl.
| | |
|---|---|
| *H01M 4/485* | (2010.01) |
| *C01G 33/00* | (2006.01) |
| *C01G 49/00* | (2006.01) |
| *H01M 4/525* | (2010.01) |
| *H01M 10/0525* | (2010.01) |

(52) U.S. Cl.
CPC ........... *H01M 4/485* (2013.01); *C01G 33/00* (2013.01); *C01G 33/006* (2013.01); *C01G 49/0018* (2013.01); *H01M 4/525* (2013.01); *H01M 10/0525* (2013.01); *C01P 2006/40* (2013.01)

(58) Field of Classification Search
CPC .............................. H01M 4/485; H01M 4/525
See application file for complete search history.

(56) References Cited

U.S. PATENT DOCUMENTS

2012/0244442 A1* 9/2012 Harada ............... H01M 4/485
429/221

FOREIGN PATENT DOCUMENTS

| EP | 2503625 A2 | 9/2012 |
|---|---|---|
| JP | 2010287496 A | 12/2010 |

OTHER PUBLICATIONS

Tena et al., "Synthesis and Characterization of $Ga_xTi_{1-2x}Nb_xO_2$ Solid Solutions", Mat. Res. Bull., vol. 27, 1992, pp. 473-481.
Tena et al., "Influence of Niobate Structures on the Formation of Rutile Solid Solutions [$M^{III}NbO_4$-$TiO_2$, where $M^{III}$=Al,Fe,Cr]", Mat. Res. Bull., vol. 27, 1992, pp. 1301-1308.
Balzer et al., "Solid Solutions in the $FeNbO_4$-$TiO_2$ System", Cryst. Res. Technol., 31, 1996, 1, pp. 93-98.
Colin et al., "A Novel Layered Titanoniobate $LiTiNbO_5$: Topotactic Synthesis and Electrochemistry Versus Lithium", Inorganic Chemistry, 45, No. 18, 2006, pp. 7217-7223.
Colin et al., "Lithium Insertion in an Oriented Nanoporous Oxide with a Tunnel Structure $Ti_2Nb_2O_9$", Chem. Mater, 20, 2008, pp. 1534-1540.
Cava et al., "Lithium Insertion in Wadsley-Roth Phases Based on Niobium Oxide", J. Electrochem. Soc.: Electrochemical Science and Technology, vol. 130, No. 12, Dec. 1983, pp. 2345-2351.
Han et al., "New Anode Framework for Rechargeable Lithium Batteries", Chem. Mater., 23, 2011, pp. 2027-2029.
Han et al., "3-V Full Cell Performance of Anode Framework $TiNb_2O_7$/Spinel $LiNi_{0.5}Mn_{1.5}O_4$", Chem Mater., 23, 2011, pp. 3404-3407.
Colin et al., "New Titanoniobates $(Li,H)_2$ $TiNbO_5$ and $(Li,H)_3TiNbO_5$: synthesis, structure and properties", J. Mater. Chem., 18, 2008, pp. 3121-3128.
Search Report and Written Opinion in International Application No. PCT/FR2014/050080 dated Nov. 5, 2014, 13 pages.

\* cited by examiner

*Primary Examiner* — Peter F Godenschwager
(74) *Attorney, Agent, or Firm* — Marshall, Gerstein & Borun LLP

(57) ABSTRACT

A lithium-free mixed titanium and niobium oxide, including at least one trivalent metal M, and having a molar ratio Nb/Ti greater than 2, said oxide being selected from the group including the material of formula (I) and the material of formula (II):

| | |
|---|---|
| $M_xTi_{1-2x}Nb_{2+x}O_{7\pm\delta}$ | (I) where $0<x\le0.20$; $-0.3\le\delta\le0.3$; |
| $M_xTi_{2-2x}Nb_{10+x}O_{29\pm\delta}$ | (II) where $0<x\le0.40$; $-0.3\le\delta\le0.3$. |

18 Claims, 1 Drawing Sheet

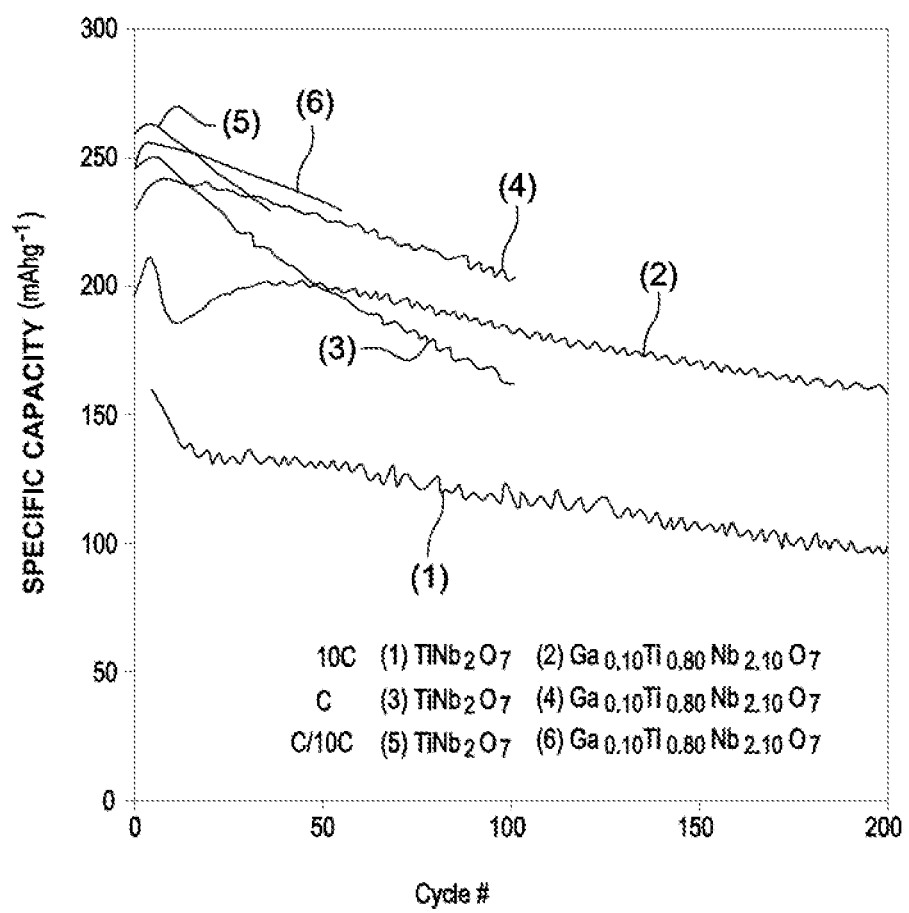

MIXED OXIDE OF TITANIUM AND NIOBIUM COMPRISING A TRIVALENT METAL

FIELD OF THE INVENTION

The invention relates to a lithium-free mixed titanium and niobium oxide comprising a trivalent metal.

The technical field of the present invention particularly relates to power storage, and more specifically to the development of electrode materials capable of being used in the manufacturing of lithium accumulators.

BACKGROUND

Lithium accumulators are more and more often used to store power and thus provide an autonomous power source, in particular in portable equipment. They comprise a positive electrode and a negative electrode having an electrode separator ensuring the conduction of $Li^+$ ions positioned therebetween.

Due to their more advantageous mass and volume energy densities, lithium accumulators tend to progressively replace nickel-cadmium (Ni—Cd) and nickel-metal hydride (Ni-MH) accumulators (the energy density is relative to the mass of the complete Li-ion cell).

Indeed, although the first Li-ion accumulators used to have an energy density of approximately 85 Wh/kg, the latest generations are close to 200 Wh/kg, that is, much more than the energy densities of Ni-MH accumulators (100 Wh/kg) and Ni—Cd accumulators (50 Wh/kg).

Thus, the next generations of lithium accumulators enable not only to widen the fields of use, but also stimulate the developing of new electrode materials to further increase their performance by improving the ratio of the energy to the mass and/or volume unit.

Generally, active positive electrode materials are layered compounds such as $LiCoO_2$, $LiNiO_2$ and mixed oxides of $Li(Ni, Co, Mn, Al)O_2$ type, or compounds of spinel structure having a composition close to $LiMn_2O_4$.

Active negative electrode materials are generally based on carbon (graphite, coke, . . . ). They may however be of $Li_4Ti_5O_{12}$ spinel type or a metal forming an alloy with lithium (Sn, Si, . . . ). The theoretical and practical specific capacities of such compounds are in the order of 370 mAh/g for graphite, and in the order of 175 mAh/g for titanium oxide.

Certain materials such as compound $Li_4Ti_5O_{12}$ have a relatively high work potential, approximately 1.6 V, which makes them very safe. They can thus be used as a negative electrode material for power applications, particularly when they also have a very good high-rate cyclability, and this despite their low capacity as compared with that of graphite.

Since niobium has a work potential close to that of titanium, the search for alternatives to the $Li_4Ti_5O_{12}$ compound as an electrode material has enabled to develop niobium oxides, but also mixed titanium-niobium oxides. It should further be noted that niobium enables to exchange 2 electrons per metal center ($Nb^{5+}/Nb^{3+}$).

Such prior art mixed Ti—Nb oxides are, in particular, the following:

$ATiNbO_5$-type layered oxides, with A=H, Li, and the corresponding condensed phase $Ti_2Nb_2O_9$ (Colin et al., "A Novel Layered Titanoniobate $LiTiNbO_5$: Topotactic Synthesis and Electrochemistry versus Lithium", Inorg. Chem., 45, 7217-7223, 2006; Colin et al., "Lithium Insertion in an Oriented Nanoporous Oxide with a Tunnel Structure: $Ti_2Nb_2O_9$", Chem. Mater., 20, 1534-1540, 2008; Colin et al., "New titanoniobates $(Li,H)_2TiNbO_5$ and $(Li,H)_3TiNbO_5$: synthesis, structure and properties", J. Mater. Chem., 18, 3121-3128, 2008);

Wadsley-Roth-type phases, for example, $TiNb_2O_7$ and $Ti_2Nb_{10}O_{29}$ (Cava et al., "Lithium Insertion in Wadsley-Roth Phases Based on Niobium Oxide", J. Electrochem. Soc., 130, 2345-2351, 1983; Han et al., "New Anode Framework for Rechargeable Lithium Batteries", Chem. Mater., 23, 2027-2029, 2011; Han et al., "3-V Full Cell Performance of Anode Framework $TiNb_2O_7$/Spinel $LiNi_{0.5}Mn_{1.5}O_4$", Chem. Mater., 23, 3404-3407, 2011).

Compounds from the first group can generate first discharge capacities close to 250 mAh/g. However, they have problems of irreversibility.

Compounds from the second group such as $TiNb_2O_7$ and $Ti_2Nb_{10}O_{29}$ appear to be particularly promising, particularly for applications requiring more energy, due their theoretical capacity (388 mAh/g and 396 mAh/g respectively), which is much greater than that of $Li_4Ti_5O_{12}$ (175 mAh/g). They also enable to keep a work potential close to that $Li_4Ti_0O_{12}$ and thus have the safety advantages thereof.

Document JP 2010-287496 describes the solid synthesis of the $TiNb_2O_7$ and $Ti_2Nb_{10}O_{29}$ compounds from precursors $TiO_2$ and $Nb_2O_5$. The two oxides thus prepared have respective capacities in the order of 270 mAh/g and 240 mAh/g.

Prior art describes the multiple-step sol-gel synthesis of $TiNb_2O_7$, by using hydrofluoric acid and citric acid. The low-rate performance of this compound reach 280 mAh/g but the capacities collapse during its high-rate use.

The high-rate cyclablity of the $TiNb_2O_7$ compound may be improved by coating with carbon and niobium doping. However, such techniques require specific atmosphere conditions (vacuum and argon), which are particularly difficult to implement at an industrial level.

Another alternative to the $Li_4Ti_5O_{12}$ compound is the solid synthesis, in a plurality of steps, of the carbon-coated $Ti_{0.9}Nb_{21}O_7$ material. It has a better high-rate behavior than $TiNb_2O_7$ obtained by sol-gel synthesis (190 mAh/g at 9C, that is, 67% of the low-rate capacity). However, such a synthesis requires using a controlled atmosphere for the doping and coating steps, respectively vacuum and argon, which is difficult to reproduce at an industrial scale.

Document EP 2 503 625 described a lithium material where a niobium portion is replaced with one or a plurality of elements. This results in a decrease in the melting temperature of the mixed titanium and niobium oxide, from 1,475° C. to 1,260° C.

The problem that the present invention aims at solving comprises providing a novel electrode material based on a mixed titanium and niobium oxide, having its specific capacity loss attenuated during charge/discharge cycles with respect to prior art mixed oxides.

BRIEF DESCRIPTION OF THE INVENTION

The material according to the invention is a mixed titanium and niobium oxide having general formula $M_xTi_yNb_zO_u$. Conversely to prior art materials, it comprises a trivalent metal M which partly replaces titanium. The trivalent metal enables to improve the stability and the lifetime of the material when it is used as an electrode material.

Trivalent metal M, means a metal having a +III degree of oxidation.

More specifically, the present invention relates to a lithium-free mixed titanium and niobium oxide, comprising at least one trivalent metal, and having a molar ratio Nb/Ti greater than 2.

Ratio Nb/Ti is strictly greater than 2.

The mixed oxide may have formula (I) or formula (II):

$$M_xTi_{1-2x}Nb_{2+x}O_{7\pm\delta} \quad (I)$$

where $0<x\leq0.20$; $-0.3\leq\delta\leq0.3$.

$$M_xTi_{2-2x}Nb_{10\pm x}O_{29\mp\delta} \quad (II)$$

where $0<x\leq0.40$; $-0.3\leq\delta\leq0.3$; molar ratio Nb/Ti being advantageously greater than or equal to 5.

The invention thus relates to a mixed titanium and niobium oxide having its loss of specific capacity attenuated during charge/discharge cycles and advantageously selected from among mixed oxides of formula (I) and mixed oxides of formula (II).

According to these two specific embodiments, the material according to the present invention corresponds to the substitution of part of the titanium contained in $TiNb_2O_7$ or $Ti_2Nb_{10}O_{29}$ with a trivalent metal.

Thus, in accordance with formulas I and II, trivalent metal M and titanium share the same sites.

Trivalent metal M may advantageously be selected from the group comprising iron, gallium, molybdenum, aluminum, boron, and mixtures thereof. They all have a degree of oxidation equal to +III when they are integrated in the mixed oxide of the invention.

According to a preferred embodiment, the trivalent metal is iron or gallium. More preferably still, the trivalent metal is gallium.

Due to its properties, and as compared with prior art compounds, the titanium and niobium mixed oxide of the invention may be used in applications requiring more energy.

It has a theoretical specific capacity which may range from 368 mAh/g to 396 mAh/g, while the $Li_4Ti_5O_{12}$ compound currently used in prior art lithium accumulators has a theoretical capacity in the order of 175 mAh/g.

The present invention also relates to a method of preparing the above-described mixed oxide, according to the steps of:
  solvothermal treatment of a solution containing at least: a titanium precursor, a niobium precursor, and a precursor of the trivalent metal;
  optionally, mechanical crushing of the mixed oxide obtained at the end of the solvothermal treatment;
  calcination of the mixed oxide.

Solvothermal Treatment

Generally, the solvothermal treatment comprises the steps of:
  bringing the titanium, niobium, and trivalent metal precursors into solution;
  precipitating the precursors;
  thermally treating, under pressure, the mixture of precipitated precursors thus obtained.

The bringing of the precursors into solution is advantageously performed in an alcohol, such as ethanol. As a variation, other alcohols may be used, such as isopropanol, butanol, or even glycols.

The precursors are advantageously solubilized in the same solution to form a homogeneous mixture. The solubilizing of some of the precursors may be implemented in the presence of an acid, such as, in particular, sulfuric acid.

The precipitation of the mixture thus obtained may be performed by adjustment of the pH, advantageously to approximately 10. This step may advantageously be implemented by adding ammonia.

The precipitation of the precursor mixture may result in a paste.

Generally, the solvothermal treatment to which the mixture of precipitated precursors is submitted may be carried out at a temperature in the range from 200 to 250° C., advantageously in the order of 220° C.

The temperature increase may correspond to a gradient in the range from 1 to 5° C./min, advantageously 2° C./min.

On the other hand, the cooling ramp may advantageously be in the range from 1 to 10° C./min, advantageously 5° C./min.

The duration of the solvothermal treatment may be in the range from 2 to 10 hours, advantageously in the order of 5 hours. Generally, the treatment time does not comprise the time necessary to heat up and to cool down the mixture.

However, the conditions may depend on the quantity of material to be treated.

According to a preferred embodiment, the solvothermal treatment is implemented in a hydrothermal pressure vessel (reactor, autoclave) to perform a thermal treatment under pressure. The "dead" volume in the container (generally made of polytetrafluoroethylene (Teflon®)) may advantageously amount to two thirds of the total volume.

Cleaning:

The method according to the invention may also comprise at least one washing step following the solvothermal treatment.

Once the solvothermal treatment is over, the resulting mixture (mixed oxide in amorphous form) advantageously in the form of a paste, may be possibly washed to separate the mixed oxide from undesired byproducts.

The washing step is preferably performed with distilled water. The washing may be performed by successive centrifugation steps until the pH of the supernatant solution is in the range from 6 to 7. Such a washing particularly enables to remove residual sulfates, chlorides, and hydroxides which may be present.

At the end of the washing, the mixture is dried, advantageously with air, particularly in a stove advantageously having a temperature of at least 60° C., and lower than 150° C.

Crushing:

The method according to the invention comprises a possible step of mechanically crushing the amorphous mixed oxide obtained at the end of the solvothermal treatment.

The crushing is advantageously performed after the optional washing. However, the crushing is performed prior to the calcination step.

This step may be carried out in the presence of an organic solvent such as an alkane, and particularly hexane.

The crushing is generally performed in a crushing mill at a speed in the range from 300 to 500 revolutions per minute, advantageously in the order of 500 revolutions per minute.

The crushing mill may for example be a Retsch-S-100-type centrifugal ball mill.

The crushing step advantageously lasts from 15 to 120 minutes, more advantageously still in the order of 30 minutes.

The crushing particularly enables to homogenize the particle size before the calcination step.

Calcination:

The thermal treatment is advantageously carried out at a temperature in the range from 700 to 1,200° C., and more advantageously still from 700 to 1,000° C.

This step advantageously lasts for from 30 min to 2 hours, more advantageously in the order of one hour.

Further, the heating rate may be in the range from 1 to 5° C./min, advantageously in the order of 3° C./min.

The cooling rate may be in the range from 5 to 20° C./min, advantageously in the order of 10° C./min.

This step promotes the crystallization of the structure of the titanium and niobium mixed oxide. It may be performed under air, just like all the steps of the method according to the invention.

It should be noted that the optimal calcination temperature of the compounds depends on the stoichiometry of the mixed oxide to be synthesized. It cannot be generalized.

Precursors:

The titanium precursor may advantageously be selected from the group comprising titanium oxysulfate ($TiOSO_4$); titanium isopropoxide ($Ti(OCH(CH_3)_2)_4$); titanium chloride ($TiCl_4$); and titanium butoxide ($Ti(OC_4H_9)_4$).

The niobium precursor advantageously is a niobium V compound, and particularly niobium chloride ($NbCl_5$) or niobium ethoxide, $Nb(OC_2H_5)_5$.

The precursors of the trivalent metals may be advantageously selected from the group comprising compounds having a +III degree of oxidation, such as in particular, $FeCl_3$, $Fe(NO_3)_3$; $Fe_2(SO_4)_3$; $GaCl_3$; $Ga(NO_3)_3$; $Ga_2(SO_4)_3$; $MoCl_3$; $AlCl_3$; $Al(NO_3)_3$; $Al_2(SO_4)_3$; $BCl_3$ . . . .

The present invention also relates to the use of the above-described mixed titanium and niobium oxide as an electrode material, particularly for a lithium-ion accumulator. It advantageously is a negative electrode material (anode).

Electrode Material

The invention also relates to the electrode comprising said mixed titanium and niobium oxide, and to the Li-ion accumulator comprising at least such an electrode.

Advantageously an electrode according to the invention further comprises a binder.

Lithium-Ion Accumulator

The Li-ion accumulator according to the invention comprises at least, successively, a negative electrode (anode), an electrode separator, and a positive electrode (cathode).

Generally, the positive and negative electrodes of this type of accumulator each contain an $Li^+$ ion insertion material.

Thus, in a Li-ion accumulator, lithium is never in metal form but in the form of $Li^+$ cations which travel back and forth between the two lithium insertion materials of the negative and positive electrodes, for each charge and discharge of the accumulator.

The negative electrode comprises a lithium insertion material, advantageously the material according to the invention, that is, the above-described mixed titanium and niobium oxide.

Each electrode is advantageously supported by a current collector, preferably metallic.

The electrodes are prepared according to techniques known by those skilled in the art, particularly by deposition, on a current collector, of an electrode ink based on a dispersion of the active material, of a binder (preferably organic), and of an electric conductor (preferably containing carbon).

The binder provides the electrode thus obtained with a good ion conduction and a satisfactory mechanical behavior.

The electrode separator is generally impregnated with an ion conductor (electrolyte) to promote the ion conduction between the anode and the cathode. The electrolyte advantageously contains an aprotic polar solvent and a salt having its cation at least partly made of lithium.

According to a specific embodiment, the electrode may be prepared from a dispersion comprising, among others, the mixed Ti—Nb oxide according to the invention, an organic binder, and an electron conductor.

The dispersion is then deposited on a metal sheet used as a current collector, for example, aluminum.

Advantageously, the binder used is a polymer which may advantageously be selected from the group comprising polymers based on methyl methacrylate, acrylonitrile, or vinylidene fluoride; polyethers; polyesters; carbomethylcellulose; and mixtures thereof.

The electron conductor enables to facilitate the transfer of the current from the electrode to the current collector. It may be in particular nanometer-range carbon such as Super P® or VGCF ("Vapor grown carbon fiber"), for example.

Thus, according to a specific embodiment, the negative electrode may be a composite formed of a mixture of the mixed Ti—Nb oxide of the invention, of a binder such as, for example, vinylidene fluoride, and an electron conductor such as, for example, carbon black (acetylene black), advantageously by proportions of 80/10/10 type, respectively.

The positive electrode of the Li-ion accumulator may be formed of any type of known material adapted for this purpose.

In the context of the present invention, not only does the positive electrode comprise an $Li^+$ ion insertion material, but it is also a lithium source for the negative electrode. It is thus advantageously made of a material capable of initially providing the $Li^+$ ions and of reinserting them afterwards.

Thus, the positive electrode may comprise a material selected from the group comprising the layered $Li_{1+v}Ni_x$-$Mn_yCo_zO_2$-type material, with $x+y+z+v=1$; the spinel-type $LiNi_uMn_{2-u}O_4$ material, with $0<u<1$; and the $LiMPO_4$ phosphate type material, with M=Fe, Mn, Co, Ni.

In addition to the active material, the positive electrode may also comprise at least one electron conductor and possible an organic binder such as those mentioned hereabove.

The electrolyte should be a $Li^+$ ion conductor. Advantageously, it comprises at least one salt comprising $Li^+$ cations, said salt being preferably selected from the group comprising $LiClO_4$; $LiAsF_6$; $LiPF_6$; $LiBF_4$; $LiR_FSO_3$; $LiCH_3SO_3$; $LiN(R_FSO_2)_2$; $LiC(R_FSO_2)_3$; LiTFSI (lithium trifluoromethane sulphonylimide); LiBOB (bis(oxalato)borate); and LiBETI (lithium bis(perfluoroethylsulfonyl)imide); and mixtures thereof.

In these formulas, the $R_F$ group is advantageously selected from among a fluorine atom and a perfluoroalkyl group comprising from one to eight carbon atoms.

The electrolyte may be obtained by dissolution of a salt comprising $Li^+$ cations in an aprotic polar solvent (ethylene carbonate, propylene carbonate, dimethyl carbonate, diethyl carbonate, ethylmethyl carbonate, . . . ). It is generally advantageously supported by the electrode separator, which is then impregnated with electrolyte.

According to another embodiment, the electrolyte may be made of a polymer. In this case, the lithium salt is not dissolved in an organic solvent, but in a solid polymer compound such as, POE (polyethylene polyoxide), PAN (polyacrylonitrile), PMMA (polymethyl methacrylate), PVdF (polyvinylidene fluoride), or a derivative thereof.

In another specific embodiment, the electrolyte may also be made of an inorganic Li+ ion conductor material, which may in particular be selected from the group comprising $Li_7La_3Zr_2O_7$; $Li_{1.4}Al_{0.4}Ge_{1.6}(PO_4)_3$; $Li_3OX$ with X=Cl or Br; $Li_{10}GeP_2S_{12}$; and a vitreous ceramic of {70 $Li_2S.27P_2S_5.3P_2O_5$} type. In this case, the negative electrode may be a composite formed of a mixture of the mixed Ti—Nb oxide of the invention, of a solid inorganic electrolyte such as, for example, $Li_7La_3Zr_2O_7$, and of an electron conductor such as, for example, carbon black (acetylene black), advantageously by proportions of 60/30/10 type, respectively.

The invention and the resulting advantages will better appear from the following drawings and examples, provided as a non-limiting illustration of the invention.

DESCRIPTION OF THE DRAWING

FIG. 1 shows the graph corresponding to the specific capacity at different rates (10C, C, C/10) of mixed oxide materials $TiNb_2O_7$ (prior art) and $Ga_{0.10}Ti_{0.80}Nb_{2.10}O_7$ (invention).

EMBODIMENTS OF THE INVENTION

Example 1: Synthesis of $Ga_{0.10}Ti_{0.80}Nb_{2.10}O_7$ 0.125 g of $GaCl_3$ and 4.025 g of $NbCl_5$ are dissolved in 10 mL of anhydrous ethanol under an inert atmosphere (argon) and magnetic stirring. The solution is transferred under air.

Are then added to this solution, 6.052 g of titanium oxysulfate ($TiOSO_4$) at 15% by mass in sulfuric acid, followed by 10 mL of ethanol to dissolve the precursors, all this under a magnetic stirring. The pH of the solution is adjusted to 10 by slow addition of ammonia $NH_3$ at 28% by mass into water.

The paste is transferred into a Teflon® container having a 90-mL capacity, which is then placed in an autoclave. The paste is then heated up to 220° C. for 5 hours with a heating and cooling ramp of 2 and 5° C./min, respectively.

The paste is then washed with distilled water by centrifugation until a pH between 6 and 7 is obtained.

The resulting compound is heated at 60° C. for 12 hours and then mechanically crushed (MC) for 30 min at 500 rpm (revolutions per minute) in hexane.

After evaporation of the solvent, the powder is calcinated at 950° C. for 1 hour with a heating/cooling ramp of 3° C./min to crystallize $Ga_{0.10}Ti_{0.80}Nb_{2.10}O_7$.

Example 2: Synthesis of $Fe_{0.10}Ti_{0.80}Nb_{2.10}O_7$ 0.116 g of $FeCl_3$ and 4.025 g of $NbCl_5$ are dissolved in 10 mL of anhydrous ethanol under an inert atmosphere (argon) and magnetic stirring.

The resulting solution is transferred under air.

Are then added to this solution, 6.052 g of titanium oxysulfate ($TiOSO_4$) at 15% by mass in sulfuric acid and 10 mL of ethanol to dissolve the precursors, all this under a magnetic stirring. The pH of the solution is adjusted to 10 by slow addition of ammonia $NH_3$ at 28% by mass into water.

The paste is transferred into a Teflon® container having a 90-mL capacity, which is then placed in an autoclave. The paste is then heated up to 220° C. for 5 hours with a heating and cooling ramp of 2 and 5° C./min, respectively.

The paste is then washed with distilled water by centrifugation until a pH between 6 and 7 is obtained. The compound is heated at 60° C. for 12 hours and then mechanically crushed (MC) for 30 min at 500 rpm in hexane.

After evaporation of the solvent, the powder is calcinated at 950° C. for 1 hour with a heating/cooling ramp of 3° C./min to crystallize $Fe_{0.10}Ti_{0.80}Nb_{2.10}O_7$.

Example 3

A metal lithium accumulator of "button cell" format is prepared, which comprises the following elements:
- a negative lithium electrode (16-mm diameter, 130-μm thickness) deposited on a nickel disk used as a current collector;
- a positive electrode formed of a disk having a 14-mm diameter sampled from a composite film having a 25-μm thickness comprising the materials of the invention prepared according to examples 1 and 2 (80% by mass), Super P carbon (10% by mass) as an electron conductor, and polyvinylidene fluoride (10% by mass) as a binder, all being deposited on an aluminum current collector (sheet having a 20-micrometer thickness);
- an electrode separator impregnated with a liquid electrolyte based on the LiPF6 salt (1 mol/L) dissolved in a mixture of ethyl carbonate, propylene carbonate, and dimethyl carbonate.

The electrochemical performance (specific capacity) between 3.0 and 1.0 V at different rates of $Ga_{0.10}Ti_{0.80}Nb_{2.10}O_7$ (invention) have been measured and compared with those of $TiNb_2O_7$ (prior art) (FIG. 1).

TABLE 1

Capacity loss percentages for $TiNb_2O_7$, $Ga_{0.10}Ti_{0.80}Nb_{2.10}O_7$, and $Fe_{0.10}Ti_{0.80}Nb_{2.10}O_7$ calculated at C/10 between the 5th and 20th cycles, at C between the 10th and 100th cycle, and at 10 C between the 20th and 200th cycles.

| Compounds calcinated at 950° C. | $TiNb_2O_7$ (Prior art) | $Ga_{0.10}Ti_{0.80}Nb_{2.10}O_7$ (example 1) | $Fe_{0.10}Ti_{0.80}Nb_{2.10}O_7$ (example 2) |
|---|---|---|---|
| C/10 | 5 | 3 | 7 |
| C | 34 | 16 | 12 |
| 10 C | 26 | 19 | 11 |

Generally, the mixed oxides according to the invention have lower capacity losses than the prior art $TiNb_2O_7$ material.

The invention claimed is:

1. A lithium-free mixed titanium and niobium oxide, comprising at least one trivalent metal M, and having a molar ratio Nb/Ti greater than 2, wherein said oxide is selected from the group consisting of a material of formula (I) and a material of formula (II):

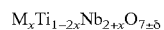

(I) where 0<x≤0.20; −0.3≤δ≤0.3;

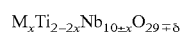

(II) where 0<x≤0.40; −0.3≤δ≤0.3.

2. The mixed titanium and niobium oxide of claim 1, wherein the at least one trivalent metal M is selected from the group consisting of iron, gallium, molybdenum, aluminum, boron, and mixtures thereof.

3. The mixed titanium and niobium oxide of claim 1, wherein the at least one trivalent metal M is iron.

4. An electrode comprising the mixed titanium and niobium oxide of claim 1.

5. An Li-ion accumulator comprising the electrode of claim 4.

6. The mixed titanium and niobium oxide of claim 1, wherein the at least one trivalent metal M is gallium.

7. The mixed titanium and niobium oxide of claim 1, having a theoretical specific capacity in a range of 368 mAh/g to 396 mAh/g, inclusive.

8. The mixed titanium and niobium oxide of claim 1, having a chemical formula $Ga_{0.10}Ti_{0.80}Nb_{2.10}O_7$.

9. The mixed titanium and niobium oxide of claim 1, having a chemical formula $Fe_{0.10}Ti_{0.80}Nb_{2.10}O_7$.

10. A method of preparing the mixed titanium and niobium oxide of claim 1, comprising the steps of:
    solvothermally treating a solution containing at least: a titanium precursor, a niobium precursor, and a precursor of the at least one trivalent metal to obtain a mixed titanium and niobium oxide;
    optionally, mechanically grinding the mixed titanium and niobium oxide obtained at the end of the solvothermal treatment; and,
    calcining the mixed titanium and niobium oxide.

11. The method of claim 10, comprising performing the calcination step at a temperature in a range from 700° C. to 1,200° C.

12. The method of claim 10, comprising performing the solvothermal treatment step at a temperature in a range from 200° C. to 250° C.

13. The method of claim 10, comprising performing the solvothermal treatment step for a duration in a range from 2 hours to 10 hours.

14. The method of claim 10, wherein the titanium precursor is selected from the group consisting of titanium oxysulfate ($TiOSO_4$); titanium isopropoxide ($Ti(OCH(CH_3)_2)_4$); titanium chloride ($TiCl_4$); and titanium butoxide ($Ti(OC_4H_9)_4$).

15. The method of claim 10, wherein the niobium precursor is selected from the group consisting of niobium chloride and niobium ethoxide.

16. The method of claim 10, wherein the precursor of the at least one trivalent metal is selected from the group consisting of $FeCl_3$; $Fe(NO_3)_3$; $Fe_2(SO_4)_3$; $GaCl_3$; $Ga(NO_3)_3$; $Ga_2(SO_4)_3$; $MoCl_3$; $AlCl_3$; $Al(NO_3)_3$; $Al_2(SO_4)_3$; and $BCl_3$.

17. The method of claim 10, comprising performing the calcination step for a duration in a range from 30 minutes to 2 hours.

18. The method of claim 10, comprising cooling the mixed oxide by 5° C. to 20° C. after the calcination step.

* * * * *

UNITED STATES PATENT AND TRADEMARK OFFICE
CERTIFICATE OF CORRECTION

PATENT NO. : 9,698,417 B2  
APPLICATION NO. : 14/762824  
DATED : July 4, 2017  
INVENTOR(S) : Lucienne Buannic et al.

Page 1 of 1

It is certified that error appears in the above-identified patent and that said Letters Patent is hereby corrected as shown below:

In the Claims

At Column 3, Line 12, "$M_xTi_{2-2x}Nb_{10\pm x}O_{29\mp\delta}$" should be -- $M_xTi_{2-2x}Nb_{10+x}O_{29\pm\delta}$ --.

At Column 5, Line 30, "$FeCl_3$," should be -- $FeCl_3$; --.

At Column 8, Line 57, "$M_xTi_{2-2x}Nb_{10\pm x}O_{29\mp\delta}$" should be -- $M_xTi_{2-2x}Nb_{10+x}O_{29\pm\delta}$ --.

At Column 10, Line 15, "$FeCl_3$," should be -- $FeCl_3$; --.

Signed and Sealed this  
Nineteenth Day of June, 2018

Andrei Iancu  
*Director of the United States Patent and Trademark Office*